2 Sheets—Sheet 1.

W. BRYENT.

Hot Air Furnace.

No. 934. Reissued March 27, 1860.

Witnesses:
J. P. Hale Jr.

Inventor:
Walter Bryant

N. PETERS, Photo-Lithographer, Washington, D. C.

2 Sheets—Sheet 2.

W. BRYENT.

Hot Air Furnace.

No. 934.

Reissued March 27, 1860.

Witnesses.

D. P. Hale Jr.

Inventor.

Walter Bryant

N. PETERS, Photo-Lithographer, Washington, D. C.

UNITED STATES PATENT OFFICE.

WALTER BRYENT, OF BOSTON, MASSACHUSETTS, ASSIGNOR, BY MESNE ASSIGNMENTS, TO JAMES W. REED.

IMPROVED AIR-HEATING FURNACE.

Specification forming part of Letters Patent No. 11,847, dated October 24, 1854; Reissue No. 934, dated March 27, 1860.

*To all whom it may concern:*

Be it known that I, WALTER BRYENT, of Boston, in the county of Suffolk and State of Massachusetts, have invented a new or Improved Air-Heating Furnace, which is designed to be used in heating the apartments of buildings; and I do hereby declare that the same is fully described and represented in the following specification and the accompanying drawings, letters, figures, and references thereof.

Figure 1:
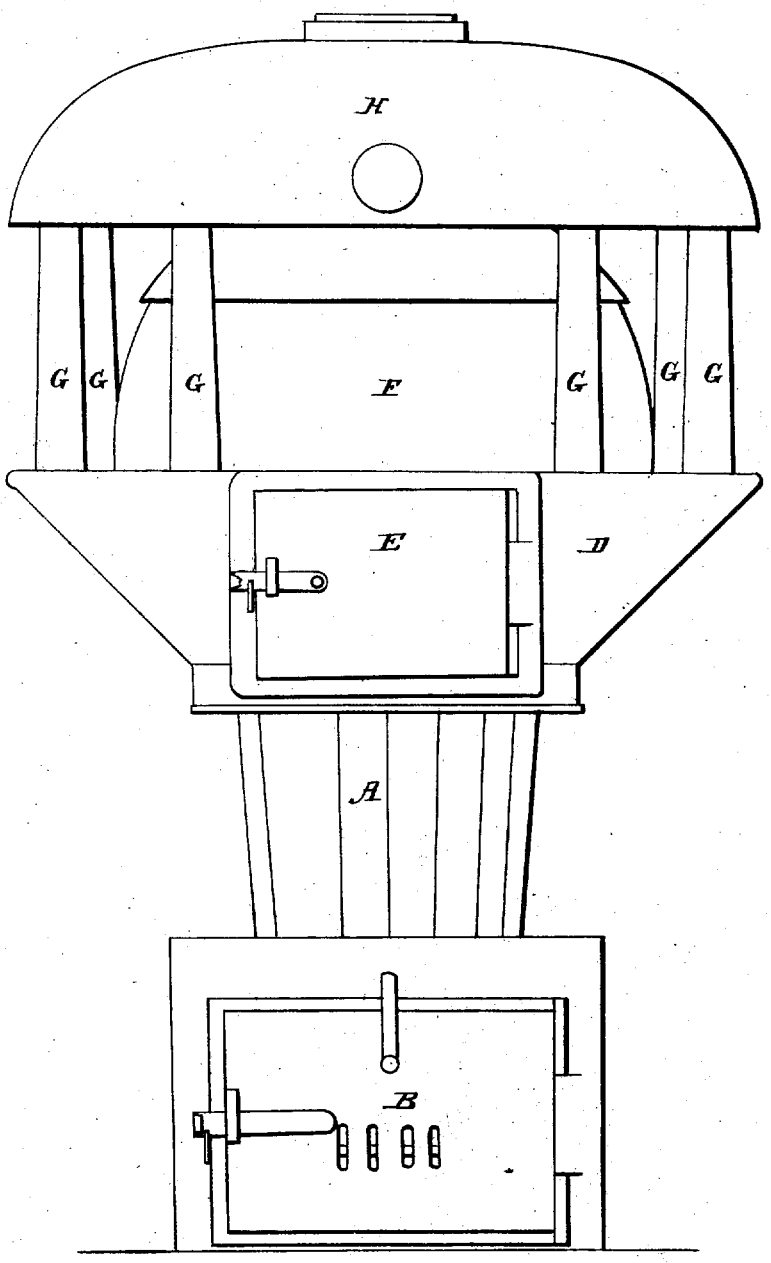
Figure 2:
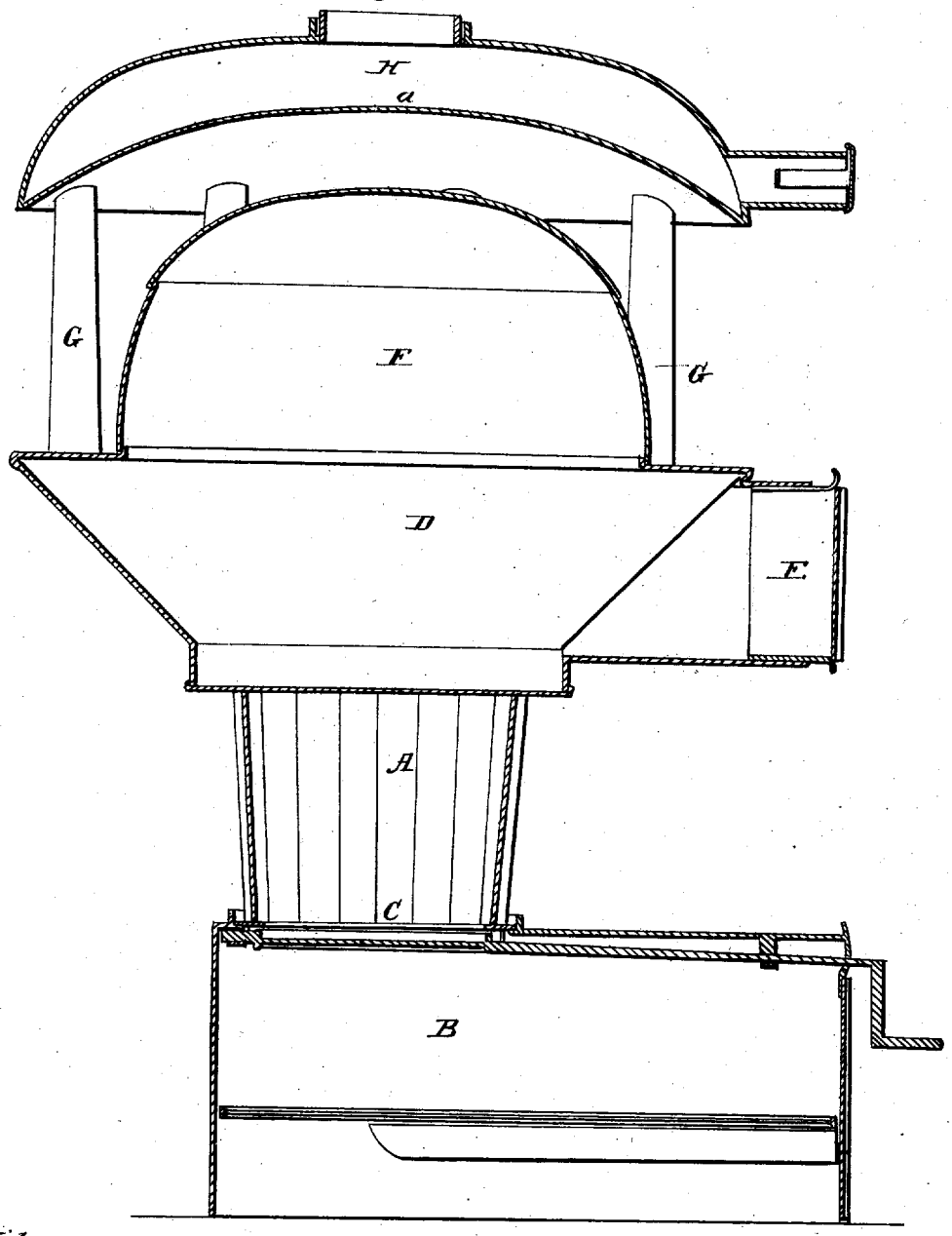

Of the said drawings, Figure 1 denotes a front elevation, and Fig. 2 a longitudinal, vertical, and central section of my improved furnace.

The said furnace is designed to be erected within a chamber formed of brick-work or other suitable material, such chamber being made to receive air at or near its bottom and to discharge the same by one or more pipes leading out of its top. As in this respect it does not differ from many other furnaces in common use, I have not deemed it necessary to exhibit such chamber in the drawings above mentioned. In such drawings the ash-pit or base of the furnace is shown at B. Over and upon this ash-pit or base the fire-pot A is placed, the said fire-pot being provided with a rocking or movable grate, C, and an inverted conical flame-chamber, D, both of which are disposed with respect to it as seen in the drawings.

The fuel for the fire-pot is supplied through a mouth-piece, E, extending from the flaring part D, and provided with a suitable closing door. The said flaring chamber D is surmounted by a dome, F, and a series of hollow columns, G G G, &c., the said series of columns being made to surround the dome and open into and support a radiator, H, which is made to extend over the entire dome F and to a short distance above the same. The said radiator H, as shown in the drawings, has its lower plate, *a*, formed in a concavo-convex shape, the concave side of it being arranged downward. The upper side also is made as a concavo-convex arch, and generally speaking, is arranged parallel to the bottom part, *a*.

The smoke and volatile products of combustion that pass into the radiator are to be discharged from it by means of a pipe or flue leading from it.

A close dome at top, and with the radiator to cover over the entire dome, as shown in the drawings operates to much better advantage in heating air than when the radiator is made as a hollow ring with an opening through it for the heated air rising from the dome to pass through. The dome, by covering the radiator, serves to retain the heated air and deflect the radiated heat of the dome.

The object of making the bottom of the radiator H concavo-convex is to cause it to better retain the heat and air between it and the top of the dome F and thoroughly heat said air; and, besides this, the concentration or retention of heat by means of it causes the plate *a* to be much better heated than it would be were it a plane. By the above construction of the plate *a* the draft through the pipes or hollow columns G G is much improved or facilitated.

In constructing my furnace I have made use of a very broad and reverberating chamber or dome, F, the volatile products of combustion being made to pass directly upward from the fire against the said dome, by which they are reverberated and caused to rush through the columns into the radiator.

I claim—

1. The improved furnace, constructed with its dome F closed at top and made to open into the radiator only through a series of columns extending upward into the same, and with a radiator having its bottom plate to cover the entire dome F in manner substantially as described.

2. The improvement in the construction of the radiator arranged over the dome of the fire-pot, the same consisting in making its bottom a concavo-convex plate or arch, and with the concave side disposed downward and directly over said dome, whereby the ascending heat from the top of the dome is retained in the concavity of said bottom, and not only made to warm to a great advantage the air that rushes into the same but to heat the radiator, so as to improve the draft through the fire-pot and supporting-columns of the radiator.

In testimony whereof I have hereunto set my signature this 8th day of February, A. D. 1860.

WALTER BRYENT.

Witnesses:

R. H. EDDY,

F. P. HALE, Jr.